United States Patent [19]

Amico

[11] Patent Number: 5,666,593
[45] Date of Patent: Sep. 9, 1997

[54] RESISTANCE TEMPERATURE DETECTOR (RTD) SENSOR FOR A HEAT AND PRESSURE FUSER

[75] Inventor: Mark S. Amico, Rochester, N.Y.

[73] Assignee: Xerox Corporation, Stamford, Conn.

[21] Appl. No.: 570,026

[22] Filed: Dec. 11, 1995

[51] Int. Cl.⁶ .................................................. G03G 15/20
[52] U.S. Cl. ...................... 399/69; 219/216; 219/471; 374/153; 374/208; 399/320
[58] Field of Search .................................. 355/282, 285, 355/290, 295; 219/216, 388, 469–471; 374/208, 153; 399/33, 67, 320, 335, 68, 69

[56] References Cited

U.S. PATENT DOCUMENTS

| | | | |
|---|---|---|---|
| 3,914,862 | 10/1975 | McBride, Jr. et al. | 29/612 |
| 4,751,495 | 6/1988 | Whitman | 219/510 X |
| 4,821,062 | 4/1989 | Katoh et al. | 355/208 |
| 4,822,570 | 4/1989 | Lerman et al. | 422/119 |
| 4,971,452 | 11/1990 | Finney | 374/208 |
| 5,040,724 | 8/1991 | Brinkruff et al. | 219/501 X |
| 5,164,161 | 11/1992 | Feathers et al. | 219/395 X |
| 5,194,890 | 3/1993 | Haruna et al. | 355/77 |
| 5,230,926 | 7/1993 | Narang et al. | 347/45 X |
| 5,281,793 | 1/1994 | Gavin et al. | 219/216 |
| 5,285,053 | 2/1994 | Fowler | 219/506 |
| 5,350,896 | 9/1994 | Amico et al. | 219/216 |
| 5,475,200 | 12/1995 | Amico et al. | 219/216 X |

FOREIGN PATENT DOCUMENTS 59-44633  3/1984  Japan .

*Primary Examiner*—S. Lee

[57] ABSTRACT

A temperature sensor for use in connection with a heat and pressure roll fuser which minimizes the problem of gloss variation due to fuser roll wear caused by sensor contact with the fuser roll surface. To this end, one or more Resistance Temperature Detector (RTD) sensors are used. Each sensor is encapsulated or embedded in a polyimide material in any desired form such as a tape. The polyimide tape including the RTD is supported in contact with the surface of the heated fuser roll. The load required for this operation is substantially less than that for a bead thermistor and the area of the sensor structure is relatively large for distributing the load over a larger surface area of the roll contacted as compared to the area of contact of a bead thermistor.

14 Claims, 3 Drawing Sheets

RESISTANCE TEMPERATURE DETECTOR (RTD) SENSOR FOR A HEAT AND PRESSURE FUSER

BACKGROUND OF THE INVENTION

This invention relates generally to a heat and pressure fuser for an electrophotographic printing machine, and more particularly the invention is directed to a device for measuring the surface temperature of a heated fuser member.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the heated fuser roll to thereby effect heating of the toner images within the nip. Typical of such fusing devices are two roll systems wherein the fusing roll is coated with an adhesive material, such as a silicone rubber or other low surface energy elastomer or, for example, tetrafluoroethylene resin sold by E. I. DuPont De Nemours under the trademark Teflon. In these fusing systems, however, since the toner image is tackified by heat, it frequently happens that a part of the image carried on the supporting substrate will be retained by the heated fuser roller (commonly known as hot offset) and not penetrate into the substrate surface. The tackified toner may stick to the surface of the fuser roll and offset to a subsequent sheet of support substrate or offset to the pressure roll when there is no sheet passing through a fuser nip resulting in contamination of the pressure roll with subsequent offset of toner from the pressure roll to the image substrate.

In order to insure that such a fuser functions at the desired operating temperatures, a thermistor or some other type temperature controlling device is employed. Conventionally, the temperature controlling device or devices physically engage the surface of the fuser member which most commonly comprises of a pair of roller members. One such fuser utilizes an internally heated fuser roll. As will be appreciated, the heated fuser member may be heated using an external source.

The most common type of temperature sensor or controller is a bead thermistor. While such a device is quite satisfactory for use in connection with black monochrome printing, use of the bead thermistor in color imaging is not satisfactory. This is because the pressure required for proper engagement of the bead thermistor with the roll surface causes, not only wear of the fuser roll surface, but it also results in image gloss variation due to the change in roll surface properties caused by such wear.

Following is a discussion of prior art, incorporated herein by reference, which may bear on the patentability of the present invention. In addition to possibly having some relevance to the question of patentability, these references, together with the detailed description to follow, may provide a better understanding and appreciation of the present invention.

U.S. Pat. No. 5,281,793 granted to Gain et on Jan. 25, 1994 discloses an apparatus for positioning a temperature sensing element in temperature sensing relationship with a moving object. The apparatus includes a base and also a resilient member, attached to the base, for supporting the sensing element. The apparatus further includes a mechanism for urging the sensing element toward the moving object. Moreover, the apparatus includes a mechanism, interposed between the resilient member and the moving object, for reducing frictional resistance between the apparatus and the moving object. The apparatus additionally includes a mechanism, removable attachable to the base, for securing the resistance reducing mechanism at a position interposed between the resilient member and the moving object. In this patent, a portion of a tape is interposed between a resilient member and a fuser roll for minimizing friction therebetween. The tape is fabricated from a polyimide film. By way of example, tape can be made from KAPTON, a trademark of E. I. duPont de Nemours & Co., Inc. of Wilmington, Del.

U.S. Pat. No. 5,194,890 granted to Haruna et al on Mar. 16, 1993 discloses a temperature sensor is fixed on the copying apparatus so that it makes contact with the surface of the heating roller which is coated with Teflon (tetrafluoroethylene). The temperature sensor is covered with KAPTON resin to improve the wear-resistance.

U.S. Pat. No. 3,914,862 granted to McBride et al discloses a method of making a sensor wherein a cylindrical KAPTON sleeve used for insulating the side walls of a can.

Japanese publication 59-44633 dated Mar. 13, 1984 discloses a temperature detector for a fixing roll wherein a polyimide sheet is made to adhere as one body to a plastic substrate.

U.S. Pat. No. 4,821,062 granted to Katoh et al on Apr. 11, 1989 discloses a thermistor employing a tape of heat resistive material such as Teflon of polyimide resin. The tape is adhered to the thermistor assembly at a position between a heat roller and the thermistor to prevent the roller from being damaged.

As will be appreciated, it would be highly desirable to be able to easily replace a worn strap or tape that costs 37 cents rather than an entire thermistor assembly.

U.S. Pat. No. 5,350,896 granted to Amico et al on Sep. 27, 1994 discloses a heat and pressure fuser for fixing toner images to substrates. A dual heating lamp arrangement is utilized for elevating the surface temperature of a heated fuser roll. The operation of the dual heat lamps is controlled using dual thermistors for maintain steady state temperature fluctuations to ±3° F. The thermistors are positioned, one adjacent the inboard end of the fuse and the other adjacent the outboard end thereof. The outboard thermistor is used to determine the desired on time of the fuser lamp and the inboard thermistor is used to determine which of the two lamps is on. If the inboard temperature is below a predetermined target value a 14 inch lamp is turned on. If the inboard temperature is at or above a predetermined target value an 11 inch lamp is turned.

U.S. Pat. application Ser. No. 08/295,375, U.S. Pat. No. 5,497,218, filed on Aug. 24, 1994 in the name of Amico et al discloses a thermistor calibration procedure wherein thermistors are calibrated by taking three thermistor resistance measurements at various temperatures. The resistance values are converted or transferred to Analog to Digital (A/D) bits or bit values which the machine's microprocessor can relate to temperature. The three values are utilized for constructing a calibration curve in the microprocessor for a specific thermistor bead. Use of the curve allows for mathematical interpolation by the microprocessor between calibration points, providing a wider and more accurate range to set the fuser roll temperatures. This increased accuracy over a wider range than before allows the sensor to become a common part for a family of products which may require different standby and runtime temperatures.

U.S. Pat. application Ser. No. 08/295,568, U.S. Pat. No. 5,497,218, filed on Aug. 25, 1994 in the name of Amico et al discloses a thermistor assembly wherein a wear resistant member is loosely disposed about a thermistor in contact with a thermistor bead such that it is between the bead and a heated fuser member and completely surrounds the components of the thermistor. The wear resistant member is in the form of a strap or tape having an opening adjacent one end through the opposite end is insertable. The inserted end is configured such that once it is inserted it can't be withdrawn through the opening. The strap is loosely supported in its operative position and can be easily removed, for example, by cutting through the strap and then withdrawing the strap from around the thermistor. Thus, a worn strap can be removed and a new one installed without discarding the thermistor and more importantly discarding the thermistor assembly.

U.S. Pat. No. 5,285,053 granted to Fowler et al on Feb. 8, 1994 discloses a control system and methods of making and operating the control system are provided, the system comprising an RTD temperature sensor, an applying unit operatively interconnected to the sensor for applying a varying voltage across the sensor and thereby providing a certain current level through the sensor for each certain voltage value being applied across the sensor while the sensor is sensing a certain temperature, and a microcomputer operatively interconnected to the sensor and the applying unit for determining from the voltage being applied across the sensor the actual temperature being sensed by the sensor, the applying unit comprising a charge pump arrangement.

U.S. Pat. Nos. 5,230,926, 5,164,161, 5,040,724, 4,971,452, 4,822,570 and 4,751,495, like the '053 patent, relate to RTD sensors.

BRIEF SUMMARY OF THE INVENTION

According to the present invention, there is provided a temperature sensor for use in connection with a heat and pressure roll fuser which minimizes the above described problem of gloss variation due to fuser roll wear caused by sensor contact with the fuser roll surface. To this end, one or more Resistance Temperature Detector RTD) sensors are used. The sensor(s) is encapsulated or embedded in a KAPTON material in any desired form such as a thin tape. The KAPTON tape including the RTD is supported in contact with the surface of the heated fuser roll. The load required for the RTD sensor of the present invention is substantially less than that for a bead thermistor.

An RTD sensor utilizes a resistance element such as a platinum or nickel wire or a platinum film whose resistance changes with ambient temperatures in a precise and known manner. The RTD sensor may be connected in a bridge circuit which generates an output signal corresponding to the ambient temperature. The load required for effecting operation thereof when used with a heated fuser roll is low enough to preclude gloss variation in fusing color images.

DESCRIPTION OF THE PREFERRED EMBODIMENT OF THE INVENTION

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 2:
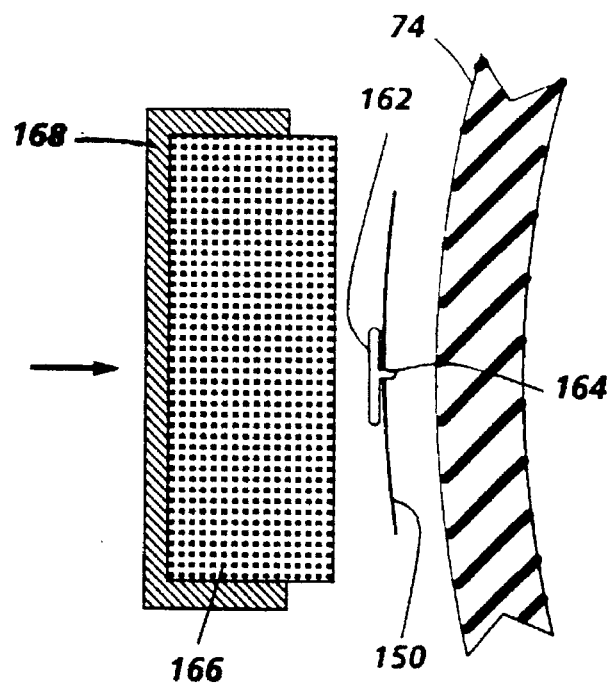
FIG. 2 is an exploded schematic view of a temperature sensing device according to the present invention.

For a general understanding of the features of the present invention, reference is made to the drawings. In the drawings, like references have been used throughout to designate identical elements. FIG. 2 is a schematic elevational view of an illustrative electrophotographic machine incorporating the features of the present invention therein. It will become evident from the following discussion that the present invention is equally well suited for use in a wide variety of printing systems, and is not necessarily limited in its application to the particular system shown herein.

Figure 4:
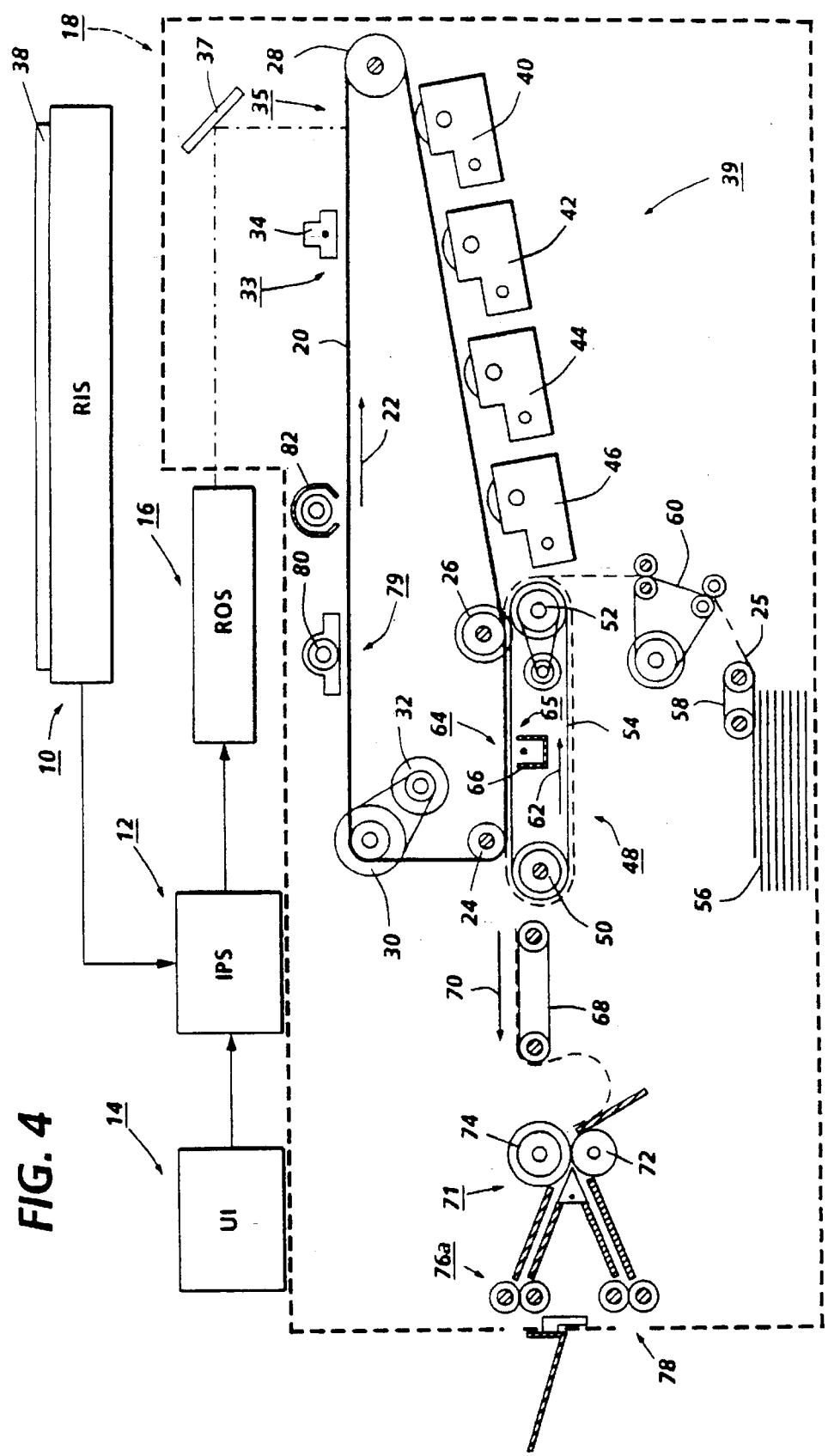
FIG. 4 is a schematic view of an imaging apparatus in which the present invention may be utilized.

Turning initially to FIG. 4, during operation of the printing system, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to an image processing system (IPS), indicated generally by the reference numeral 12. IPS 12 contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The output signal from UI 14 is transmitted to IPS 12. A signal corresponding to the desired image is transmitted from IPS 12 to ROS 16, which creates the output copy image. ROS 16 lays out the image in a series of horizontal scan lines with each line having a specified number of pixels per inch. ROS 16 includes a laser having a rotating polygon mirror block associated therewith. ROS 16 exposes a charged photoconductive belt 20 of a printer or marking engine, indicated generally by the reference numeral 18, to achieve a set of subtractive primary latent images. The latent images are developed with cyan, magenta, and yellow developer material, respectively. These developed images are transferred to a copy sheet in superimposed registration with one another to form a multi-colored image on the copy sheet. This multi-colored image is then fused to the copy sheet forming a color copy.

With continued reference to FIG. 4, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform electrostatic potential.

Next, the charged photoconductive surface is moved through an exposure station, indicated generally by the reference numeral 35. Exposure station 35 receives a modulated light beam corresponding to information derived by RIS 10 having a multi-colored original document 38 positioned thereat. RIS 10 captures the entire image from the original document 38 and converts it to a series of raster scan lines which are transmitted as electrical signals to IPS 12. The electrical signals from RIS 10 correspond to the red, green and blue densities at each point in the original document. IPS 12 converts the set of red, green and blue density signals, i.e. the set of signals corresponding to the primary color densities of original document 38, to a set of colorimetric coordinates. The operator actuates the appropriate keys of UI 14 to adjust the parameters of the copy. UI 14 may be a touch screen, or any other suitable control panel, providing an operator interface with the system. The output signals from UI 14 are transmitted to IPS 12. The IPS then transmits signals corresponding to the desired image to ROS 16. ROS 16 includes a laser with rotating polygon mirror blocks. Preferably, a nine facet polygon is used. ROS 16 illuminates, via mirror 37, the charged portion of photoconductive belt 20 at a rate of about 400 pixels per inch. The ROS will expose the photoconductive belt to record three latent images. One latent image is developed with cyan developer material. Another latent image is developed with magenta developer material and the third latent image is developed with yellow developer material. The latent images formed by ROS 16 on the photoconductive belt correspond to the signals transmitted from IPS 12.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing toner particles onto the electrostatic latent image recorded on photoconductive belt 20. Similarly, a blue separation is developed by developer unit 42 with blue absorbing toner particles, while the red separation is developed by developer unit 44 with red absorbing toner particles. Developer unit 46 contains black toner particles and may be used to develop the electrostatic latent image formed from a black and white original document. Each of the developer units is moved into and out of an operative position. In the operative position, the magnetic brush is closely adjacent the photoconductive belt, while in the non-operative position, the magnetic brush is spaced therefrom. In FIG. 4, developer unit 40 is shown in the operative position with developer units 42, 44 and 46 being in the non-operative position. During development of each electrostatic latent image, only one developer unit is in the operative position, the remaining developer units are in the non-operative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances sheet 25 to sheet transport 48. Sheet 25 is advanced by transport 60 in synchronism with the movement of sheet gripper 84. In this way, the leading edge of sheet 25 arrives at a preselected position, i.e. a loading zone, to be received by the open sheet gripper. The sheet gripper then closes securing sheet 25 thereto for movement therewith in a recirculating path. The leading edge of sheet 25 is secured releasably by the sheet gripper. As belts 54 move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper electrostatic voltage magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another. One skilled in the art will appreciate that the sheet may move in a recirculating path for four cycles when under color black removal is used and up to eight cycles when the information on two original documents is being merged onto a single copy sheet. Each of the electrostatic latent images recorded on the photoconductive surface is developed with the appropriately colored toner and transferred, in superimposed registration with one another, to the sheet to form the multi-color copy of the colored original document.

After the last transfer operation, the sheet gripper opens and releases the sheet. A conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76a to catch tray 78 for subsequent removal therefrom by the machine operator.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 1:
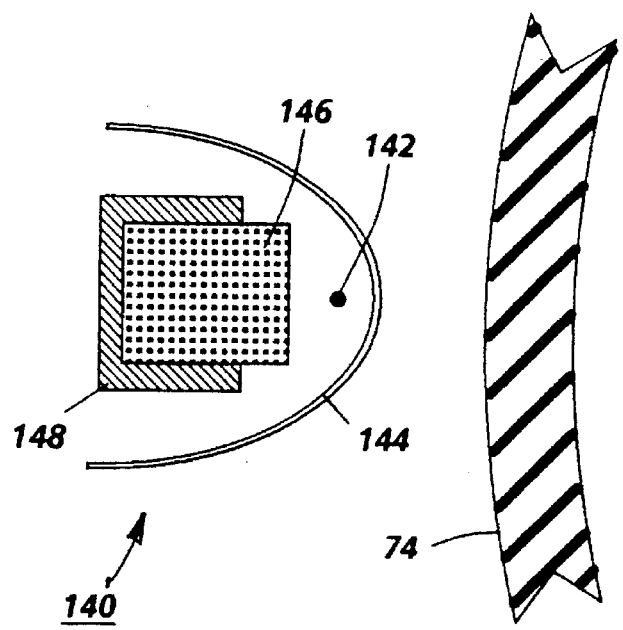
FIG. 1 is an exploded schematic view of a bead thermistor of a type well know in the art.

A conventional temperature sensor 140 such as a bead thermistor, as illustrated in FIG. 1, comprises a thermistor bead 142 disposed intermediate a KAPTON member 144 and a foam pad 146. The member 144 provides a low friction interface with an elastomeric surface of a heated fuser roll. A pad holder 148 holds the foam pad in its operative position and serves to apply a load to the pad and, in turn, the required loading to the thermistor bead which loading is applied to the surface of the fuser roll 74 via the member 144. Typically, a load of 50 grams is used for applying the required operating load. The aforementioned load is applied to a thermistor bead which has a 1 mm diameter and a length of 3 mm. Such a construction causes localized wear of the elastomeric surface of the fuser roll. Such roll surface wear results in image gloss variation to the toner images which is undesirable.

Figure 3:
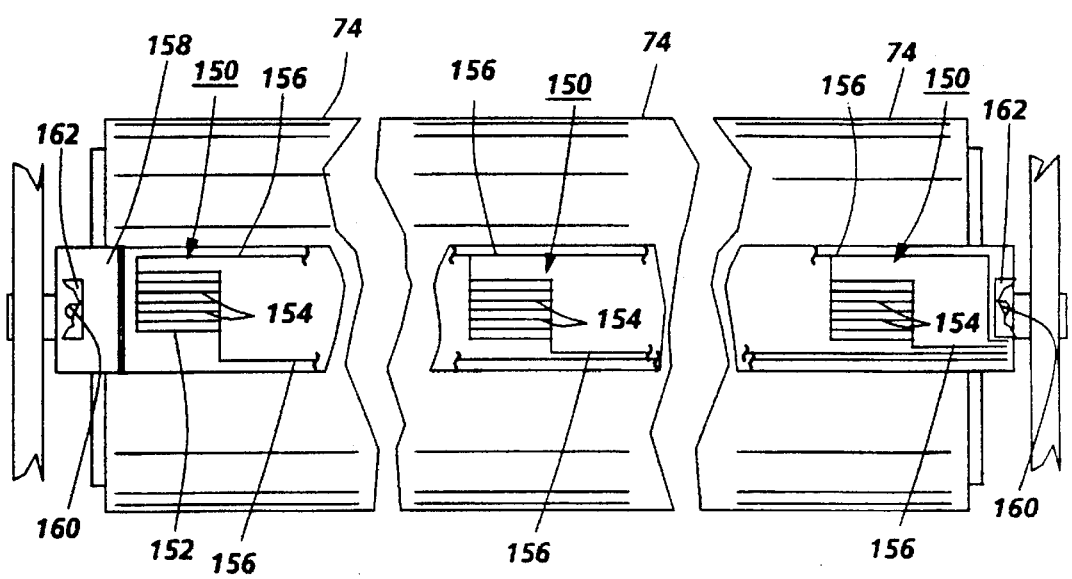
FIG. 3 is a plan view of a fuser roll and temperature sensing device according to the present invention.

According to the present invention, as illustrated in FIG. 2, there is provided a temperature sensor for use in connection with a heat and pressure roll fuser which minimizes the problem of gloss variation due to fuser roll wear do caused by sensor contact with the fuser roll surface. To this end, one or more Resistance Temperature Detector (RTD) sensor elements 150 are employed. A sensor member or element 152 (FIG. 3) forming a part of the sensor 150 may be fabricated from materials such platinum or nickel having a thickness approximately equal to 0.0005 inch. The sensor member 152 may be fabricated using well know photoetching techniques. As shown in FIG. 3 the sensor member may comprise a plurality of individual segments 154 arranged in a parallel pattern. Lead elements 156 for supplying a suitable voltage to the individual segments are also formed by photoetching. Each pattern covers an area of approximately 1 square inch. The polyimide support member as shown has a somewhat larger area and is translucent such that the sensor element or elements can be seen therethrough, FIG. 3.

The sensor or sensor elements 152 are encapsulated or embedded in a support member 158 comprising a polymide material such as KAPTON (a trademark of the E. I. duPonte de Nemours & Co.) which is characteristically a low friction material. The support member 158 preferably has a thickness of approximately 0.003 inch. The polyimide support member is provided with a plurality of apertures 160 adjacent each of its ends. Machine frame members 162 (only one shown) comprise locator pins 164 which are received in the apertures 160 for supporting the support member in its operative position in contact with the fuser roll surface and a foam pressure pad 166. The foam pressure pad is carried by a holder member 168 which transmits a total load of about 25 grams or approximately 0.155 grams per square inch of polyimide surface. Such a loading is about half of that used for thermistor beads and is distributed over a much larger surface area of the surface of the heated fuser roll.

The RTD sensor is connected in a bridge circuit (not shown) which generates an output signal corresponding to the ambient temperature. The relatively low load requirement together with the relatively large distribution of the load on the surface of the fuser roll serves to minimize surface wear, thus precluding gloss variation in fusing color images.

What is claimed is:

1. A heat and pressure roll fuser for fusing color toner images, said fuser comprising:

a heated fuser roll;

a pressure roll supported for pressure engagement with said heated fuser a temperature sensor supported for contact with a surface of one of said rolls, said temperature sensor having a configuration permitting distribution of a load applied thereto over a relatively large area of said surface; and means for effecting loading of said temperature sensor over an extended period of time without causing uneven wear of said surface.

2. The roll fuser according to claim 1 wherein said temperature sensor has a large surface area.

3. The roll fuser according to claim 1 wherein said one of said rolls is said heated fuser roll and wherein said temperature sensor comprises a plurality of temperature sensing patterns for sensing a plurality of areas of said surface of said heated fuser roll.

4. The roll fuser according to claim 3 wherein said plurality of temperature sensing patterns comprise a plurality of sensor elements and a single support therefor.

5. The roll fuser according to claim 4 wherein said single support comprises a relatively thin polyimide member.

6. The roll fuser according to claim 3 wherein each of said plurality of temperature sensing patterns is fabricated from platinum and has a thickness approximately equal to 0.0005 inch.

7. The roll fuser according to claim 6 wherein said temperature sensor comprises a support member fabricated from a relatively thin polyimide material, at least one of said temperature sensing patterns being embedded in said support member.

8. The roll fuser according to claim 7 wherein said support member has a thickness of 0.003 inch and said at least one temperature sensing patterns comprises a plurality of parallel members.

9. The roll fuser according to claim 8 wherein said at least one temperature sensing patterns covers an area approximately equal to 1 square inch.

10. The roll fuser according to claim 2 wherein said temperature sensor comprises a plurality of temperature sensing patterns for sensing a plurality of areas of said a surface of one of said rolls.

11. The roll fuser according to claim 10 further including a single support for said plurality of temperature sensing patterns.

12. The roll fuser according to claim 11 wherein said single support comprises a relatively thin polyimide member.

13. The roll fuser according to claim 12 wherein said support has a thickness of 0.003 inch and said temperature sensing patterns comprise a plurality of parallel members.

14. The roll fuser according to claim 13 wherein each of said patterns covers an area approximately equal to 1 square inch.

* * * * *